A. L. POWELL.
TRANSMISSION FOR ENGINES.
APPLICATION FILED DEC. 8, 1920.

Patented July 12, 1921.
10 SHEETS—SHEET 8.

A. L. POWELL.
TRANSMISSION FOR ENGINES.
APPLICATION FILED DEC. 8, 1920.

1,384,335.

Patented July 12, 1921.
10 SHEETS—SHEET 10.

Inventor
Alvah L. Powell

UNITED STATES PATENT OFFICE.

ALVAH L. POWELL, OF MILES CITY, MONTANA, ASSIGNOR TO THE A. L. POWELL POWER CO., OF MILES CITY, MONTANA, A CORPORATION.

TRANSMISSION FOR ENGINES.

1,384,335.

Specification of Letters Patent. Patented July 12, 1921.

Application filed December 8, 1920. Serial No. 429,168.

*To all whom it may concern:*

Be it known that I, ALVAH L. POWELL, citizen of the United States, residing at Miles City, in the county of Custer and State of Montana, have invented certain new and useful Improvements in Transmission for Engines, of which the following is a specification.

My invention relates to improvements in the transmitting member of engines by which I secure a variation in the movement of the piston with reference to that of the crank, that enables me to gain advantages in the operation of such engines that are impossible with the construction at present used. My improvement consists in the introduction of a lever, between the piston and crank rod, that alters the piston movement with reference to that of the crank so that, while this piston may move, say, six inches, the crank will travel only four. The lever to which I refer acts, therefore, as a reducing agent with reference to the engine speed, the additional force developed in the longer stroke of the piston enabling me to produce the same power at a lower speed of the crank. In the majority of heat engines it is desirable to reach the theoretical power at a minimum speed. Certain very useful types of these engines are handicapped by the great number of revolutions necessary to develop the power for which they were designed. In the explosion engine in particular, that is, those in which air and gaseous vapor are mixed and ignited, high speed is the rule. In my invention I am able to reduce this, the additional cylinder space, and consequent increase of piston stroke, lengthening the interval of movement with reference to time, thus effecting a slowing down of the engine without reducing power.

In all engines intended for high duty this is desirable. Marine engines of the explosion class furnish power to the driving shaft through systems of gearing that involve expense and greater wear and tear than is found with the direct connecting gear of reciprocating steam engines. This greater wear is an essential defect in all such power machines. On the other hand, by using the additional working area in the cylinder I am able to secure a further expansion of the charge, with a consequent increase of thermal efficiency; or, I may increase the volume of the charge and power of the engine at the same time, securing from it the working advantages of an engine of, say, six inch stroke, compressed, or concentrated, into a crank movement of four, thus raising the torque of the engine shaft. To go further, I may utilize this extra part of the stroke as a cooling means, as hereinafter to be described. In engine design this piston relation to stroke effects a reduction of cylinder surface, with reference to crank power, of great importance to the designer, as a minimum of radiation surface for a given horse power is made possible.

Many modifications of the lever principle I employ are possible, but I have confined my description to a specific form, embraced in the drawings annexed, but I include in the views covered by the drawings some modifications of the main design, and some applications of my invention to standard types of engines. Of these drawings—

Figure 1:
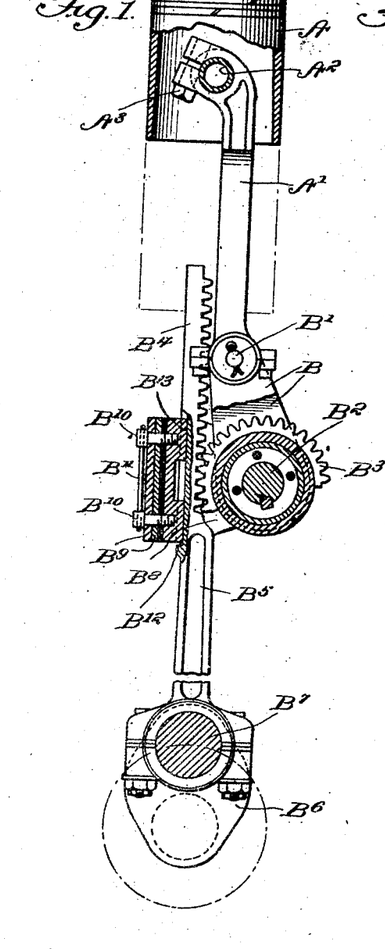
Figure 1 is an elevation, partly in section, of the variable movement lever, showing it in connection with a cylinder and crank shaft.
Figure 2:
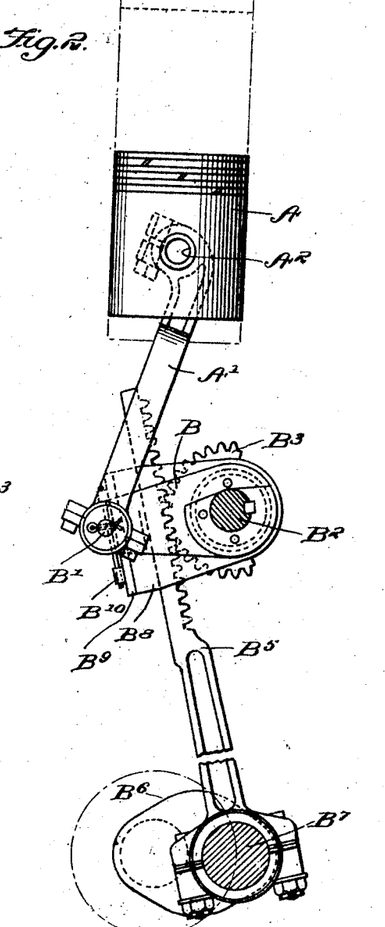
Fig. 2 is the same at quarter stroke.

In Fig. 1 the piston A of a gas engine transmits motion through the piston rods, or links, $A^1$, $A^1$, hung on a pin, $A^2$, that passes through the piston walls. These links are loosely held on the pin by means of the bolt shown, and a bushing, $A^3$, is employed to allow for wear. The links $A^1$, $A^1$, connect with crank levers, B, B, by means of pins shown at $B^1$. The crank levers, B, B, are attached to a pin, $B^2$, suitably supported in the engine frame. On the same pin there is a segmental pinion, $B^3$; this pinion, and the crank levers B, B, being keyed to the pin $B^2$. The segmental pinion $B^3$ engages a rack, $B^4$, that forms part of a connecting rod, $B^5$. The connecting rod is attached to the shaft crank $B^6$, by a wrist pin $B^7$, the construction being conventional. On the pin $B^2$ there are also swung two arms, $B^8$, which form a support for a slide bearing in which the connecting rod $B^5$ moves. The arms $B^8$, $B^8$ are loosely hung on the pin $B^2$ in order to allow free movement with reference to the motion of the connecting rod, $B^5$. To give proper support to the rod $B^5$ the arms, $B^8$, $B^8$ are provided with a tongued sliding surface, $B^{13}$, held in position by a cap, $B^9$, and the tap bolts, $B^{10}$, $B^{10}$. Proper wearing surfaces on the rod $B^5$ are provided at $B^{12}$, a free sliding groove for said rod being thus furnished. A sectional view of this construction is given in Fig. 4.

Under the conditions described it is evident that on the outstroke of the piston the lever crank B will swing in an arc downward, rotating the pin $B^2$, and causing the segmental pinion to transmit movement to the toothed connecting rod, $B^5$. This rod will move the shaft crank, $B^6$, thus transmitting the power developed in the engine cylinder to the engine shaft. The connecting rod will move in the guiding and retaining means provided by the capped arms, $B^8$, $B^8$, and, as the piston moves forward and backward, the reciprocating motion of the said piston will be converted into a movement of rotation at the crank circle. It will be noted, however, that the crank B is attached to the piston links $A^1$—$A^1$ at a point corresponding with the length of said crank, while the segmental pinion $B^3$ moves in a lesser diameter. As shown in Fig. 1, the variation between the lever B and segmental pinion $B^3$ has a proportion of approximately two to one, and the movement of the said B will be the same as that of the engine piston A, from which it derives its motion. Power to the crank $B^6$ will be transmitted by the racked connecting rod $B^5$, which will take its motion from the segmental pinion $B^3$. Assuming a piston stroke of six inches, the shaft crank $B^6$ will have a throw governed by the pitch diameter of the segmental pinion $B^3$. Under these conditions the stroke of the crank $B^6$ will be four inches.

The force developed in a long stroke is, in this way, concentrated in the shorter stroke of a suitably connected crank, the effect being a leverage that compresses the power of a six inch working piston stroke into a four inch working crank stroke. I thus gear down piston movement to secure power concentration, the leverage means employed being composed of members inherent in the transmitting means. These means are of a practical and effective form, adapted to long wear, and are simple with reference to structure.

It is evident that in an engine cylinder the duration of piston stroke is a variable quantity, for as the length increases the time of travel extends, other factors being equal. The speed of shaft rotation will therefore be less, in an engine of long stroke than in one that is shorter, diameters, volume, compression and back pressure remaining the same, but the transmitted power will correspond to that of the energy developed during the piston stroke. Under these conditions I can, by reason of the extra length of stroke I secure by the use of a lever system between power cylinder and crank shaft, effect a reduction of speed that is of great importance in engine design while, at the same time, retaining the power of a cylinder of given diameter. It is obvious that the proportion of excess stroke over that of the engine crank may be varied by altering the distance of the pin B¹ and the pitch circle of the pinion B³.

Figures 3, 4, 5, 6:
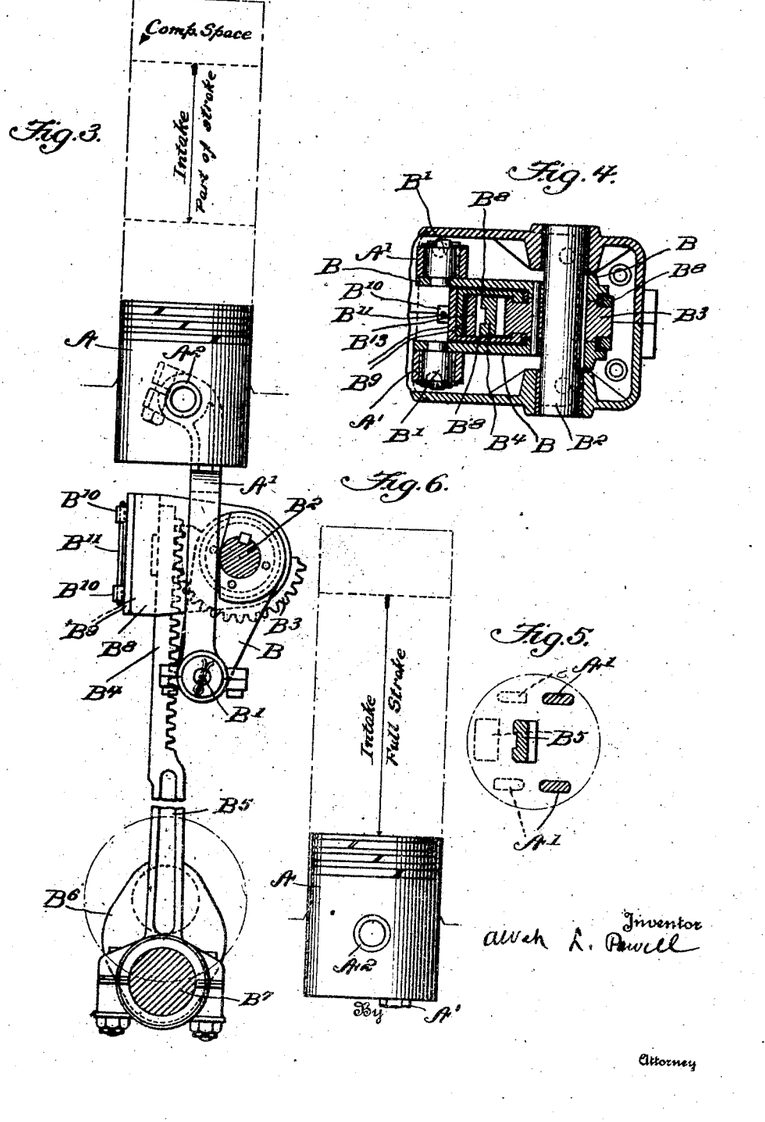
Fig. 3 is the same at half stroke.
Fig. 4 is a sectional view of the lever mechanism.
Fig. 5 shows, in section, the variation in position of the connecting rod rack.
Fig. 6 is a diagram of the intake, at full stroke.
Figures 7, 8, 9, 10, 11, 14, 15:
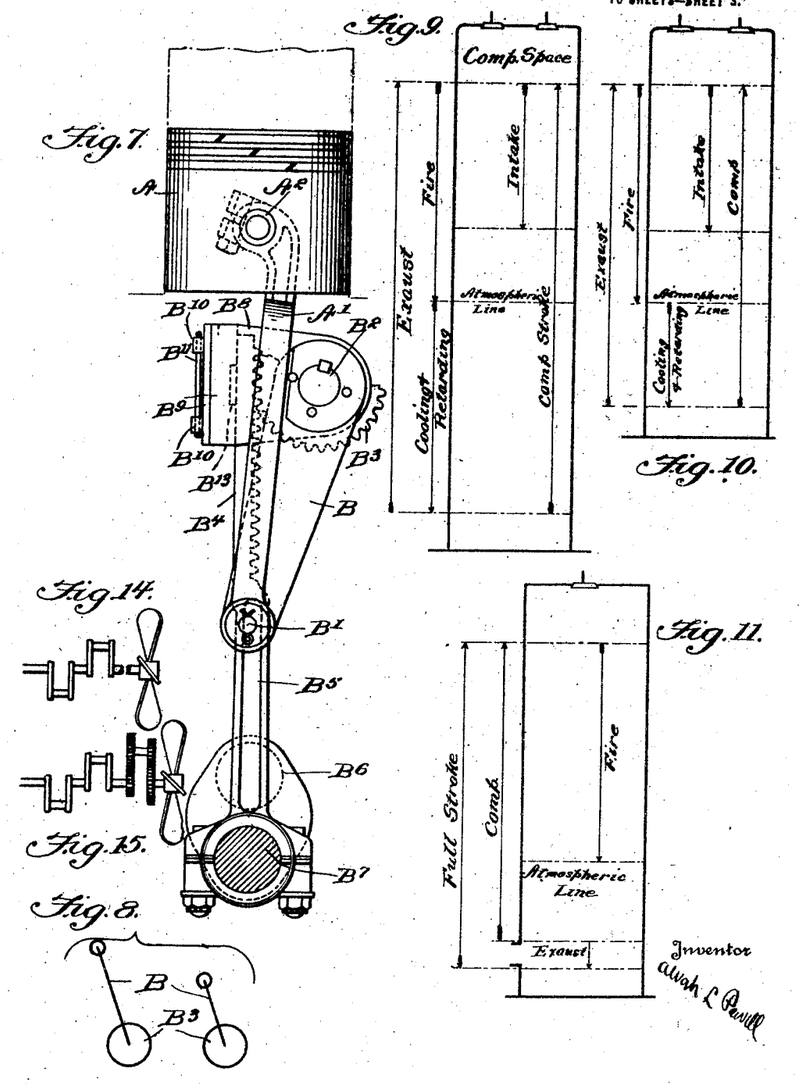
Fig. 7 is an elevation of the lever mechanism, showing piston at end of downstroke.
Fig. 8 is a diagram to show that the leverage may be varied to secure any desired stroke.
Fig. 9 is a diagram of the power cycle, where the additional area of the stroke is used for a cooling and retarding means.
Fig. 10 is another diagram, to accompany Fig. 9.
Fig. 11 is a diagram of a two cycle engine, embracing my variable stroke.
Figs. 14 and 15 show a method of connecting the engine for high and low power.

In an engine of this type the additional piston stroke may be utilized for other purposes than that of the direct development of power, but securing thereby advantages equivalent thereto. Let it be assumed that in an engine of relatively small diameter the piston stroke is twelve inches. The expansive force of the charge will exert pressure against the piston for a distance corresponding to the fall of temperature of the expanding charge, and this will insure power development to a point approximately beyond the middle of the stroke; that is, for a distance greater than six inches. The piston will, thereafter, travel by the momentum of the crank mechanism, absorbing power from it and acting as a braking, or retarding, means, lowering engine speed. At a point in the long stroke a condition of partial vacuum will develop in the cylinder, which will tend to lower the temperature of the spent gases and, further, lead to an absorption of heat from the cylinder and piston walls. At the end of stroke, when the exhaust valve opens, atmospheric pressure will be restored in the cylinder, and the incoming air will retain the heat that has been absorbed by the burnt gases from the engine walls. This heat will pass through the exhaust valve with the dead charge. In an engine of this kind part of the stroke of the piston would develop power, while, during the remainder, it would act as a pump for removing heat. While the action was taking place this would involve a loss of power, but the cooling effect on walls and piston would raise the efficiency of the engine as a whole. The point of exhaust could also be extended, permitting the expansion of the power charge to an extreme point. In Fig. 11 I show a diagram of the operation of my differential principle to a two cycle engine. In Fig. 5 the positions of the rack and the longitudinal positions of the piston rods A¹—A¹ are shown at extreme points of stroke. Figs. 1, 2, 3 and 7 show the positions of the variable stroke members through one revolution.

Figures 12, 13:
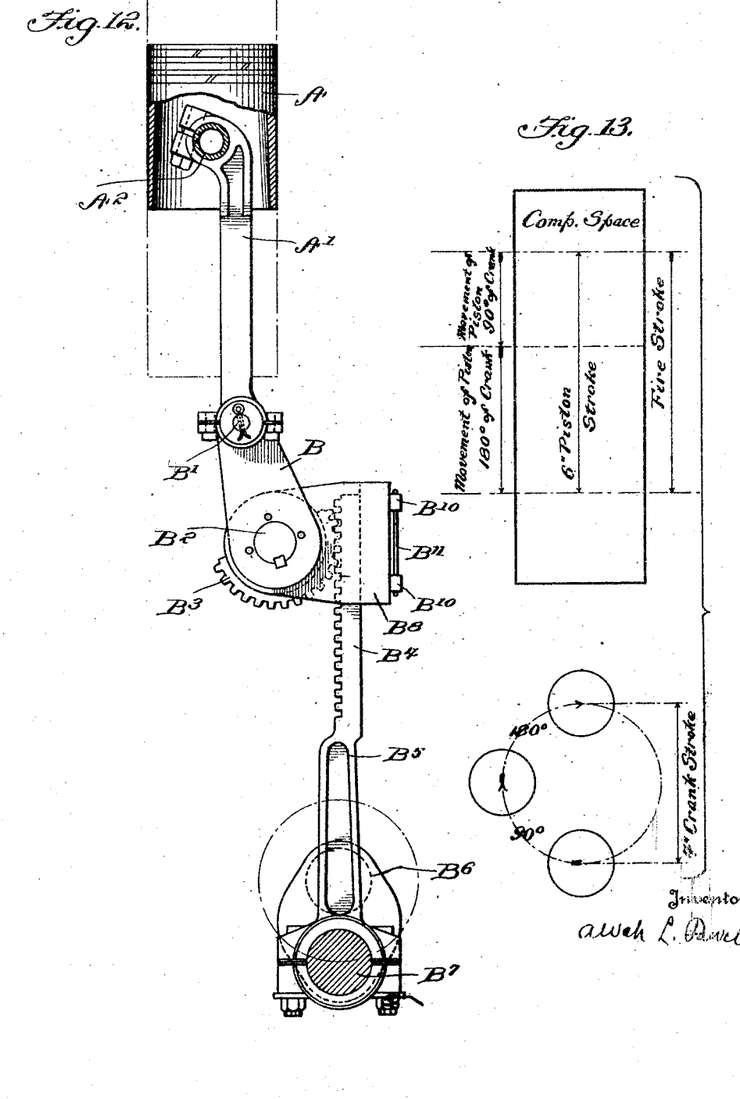
Fig. 12 is an elevation, showing a modification in the arrangement of the crank shaft with reference to the engine cylinder.
Fig. 13 is a diagram of the relation of the piston movement to that of the crank, and shows the full stroke when it is used for maximum power.

In Fig. 12 I show a novel arrangement of my transmitting members, by means of which I am able to throw the center of the crank shaft beyond the center line of the piston, without altering movement or lowering efficiency.

Figure 16:
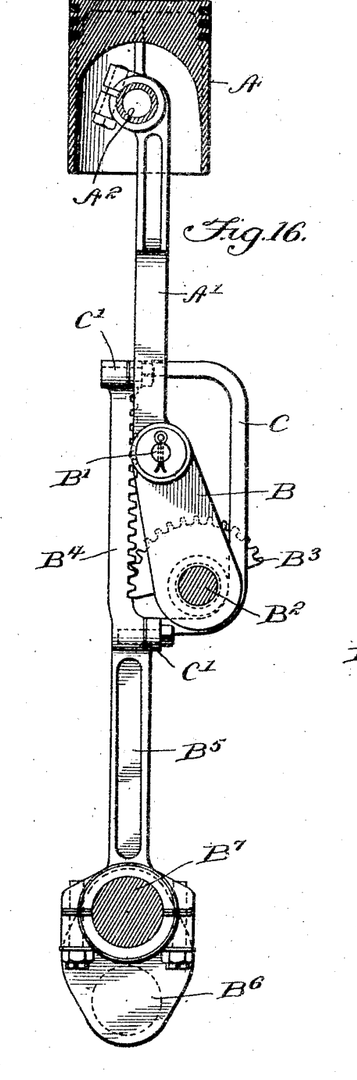
Fig. 16 is a view in elevation showing a modification in the construction of the lever mechanism.
Figure 17:
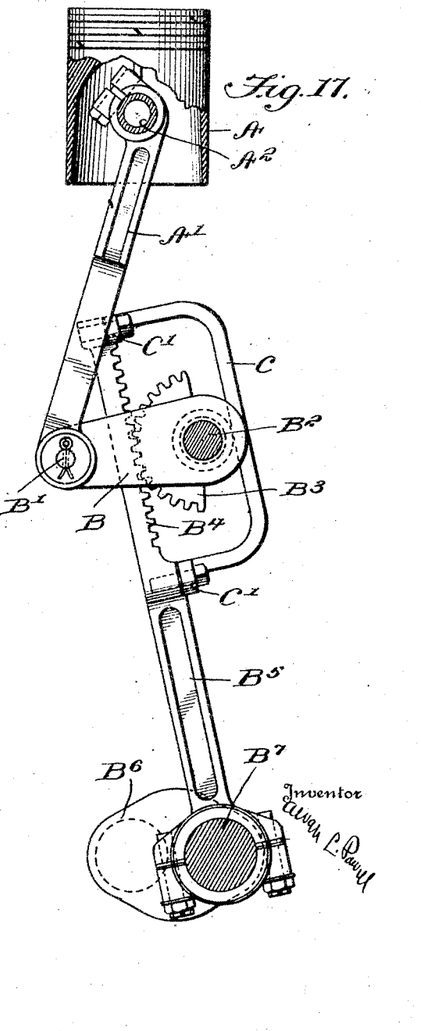
Fig. 17 shows the parts given in Fig. 16 in another part of the stroke.
Figures 18, 26:
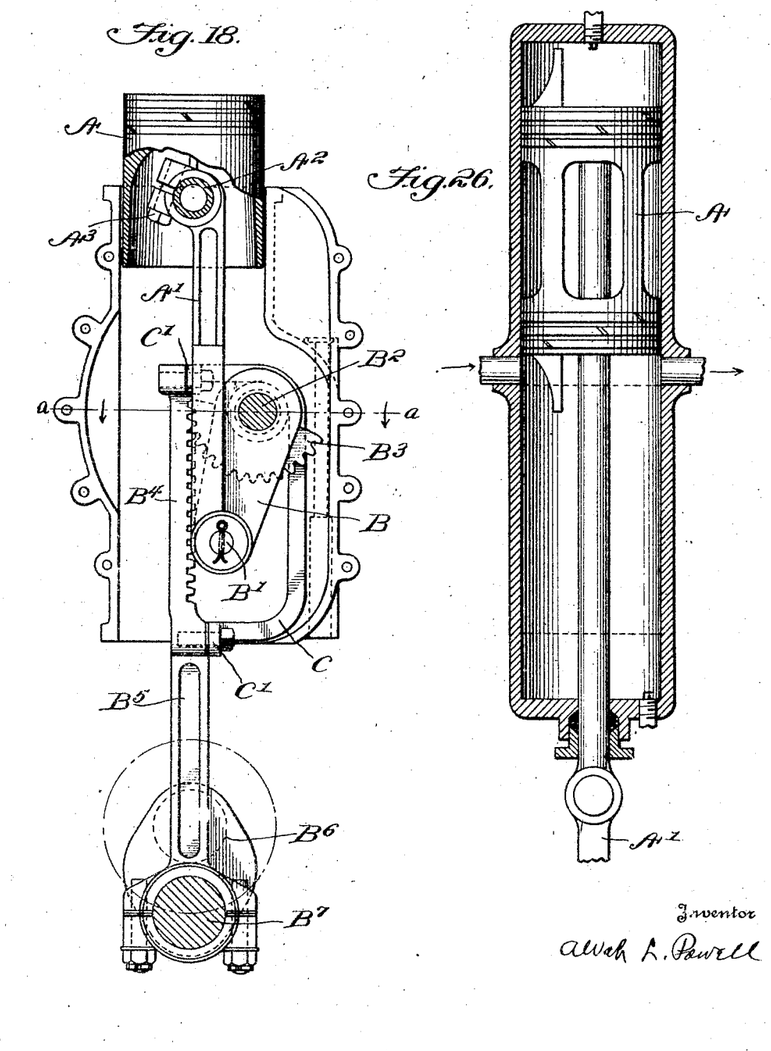
Fig. 18 is the same, at end of stroke.
Fig. 26 represents the cylinder and pistons of a two cycle engine of the double action class, to indicate that my improvement may be applied to such engines, deriving the advantage of power on both sides of stroke.
Figures 19, 20, 27, 28:
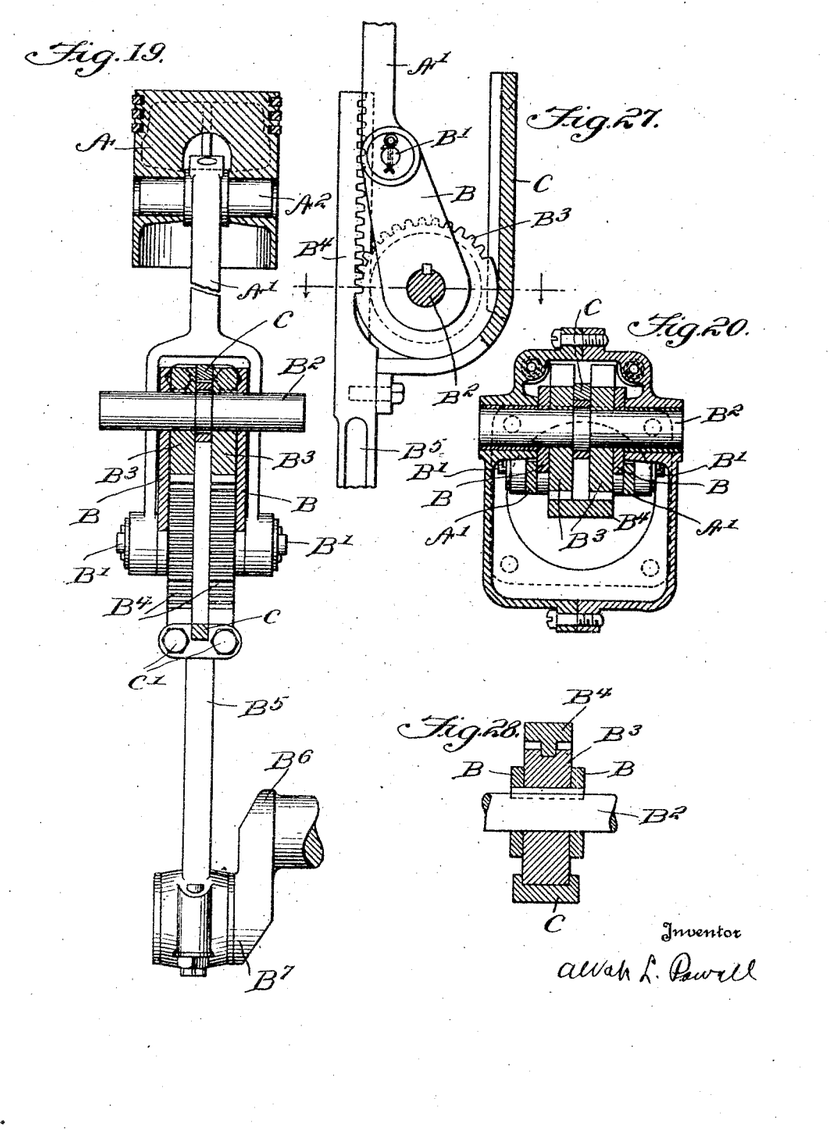
Fig. 19 is a longitudinal section of the same, the parts being shown in elevation.
Fig. 20 is a transverse section on the line $a-a$, Fig. 18.
Fig. 27 is a further modification of the yoke-supported rack form of my improvement.
Fig. 28 is a sectional view, on the dotted line (Fig. 27) shown with arrows.

A modification of my transmitting members is shown in Figs. 16, 17, 18. In this structure I displace the slide arm B⁸ using, instead, a guide in the nature of a yoke, C, arranged to press against a loose collar on the pin B². As the segmental pinion B³ tends to force the rack away the surface of C, pressing against the collar on B², holds it in proper alinement with reference to the movement of the connecting rod B⁵. In this construction I employ, preferably, two racks and two segmental pinions, the guide C moving between, as shown in the vertical elevation, Figs. 19 and 20, the latter a sectional view. The guide C is attached to the connecting rod B⁵ by means of tap bolts, as shown at C¹, C¹.

Figure 21:
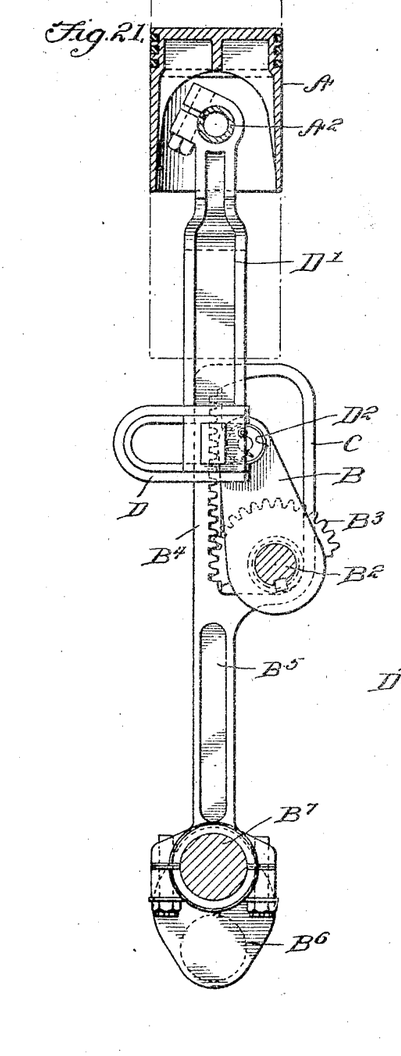
Fig. 21 shows a modification of the construction given in Figs. 16 to 20, inclusive.
Figure 22:
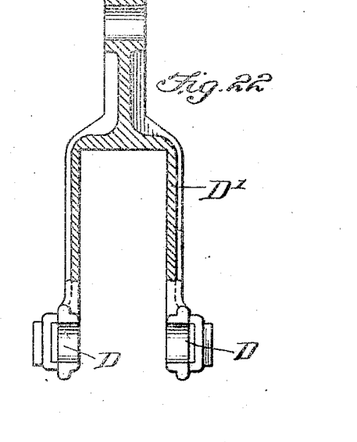
Fig. 22 is a longitudinal section of the piston rod shown in Fig. 21.
Figure 23:
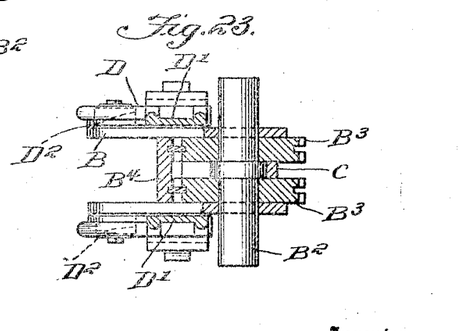
Fig. 23 is a transverse section of the same.
Figure 24:
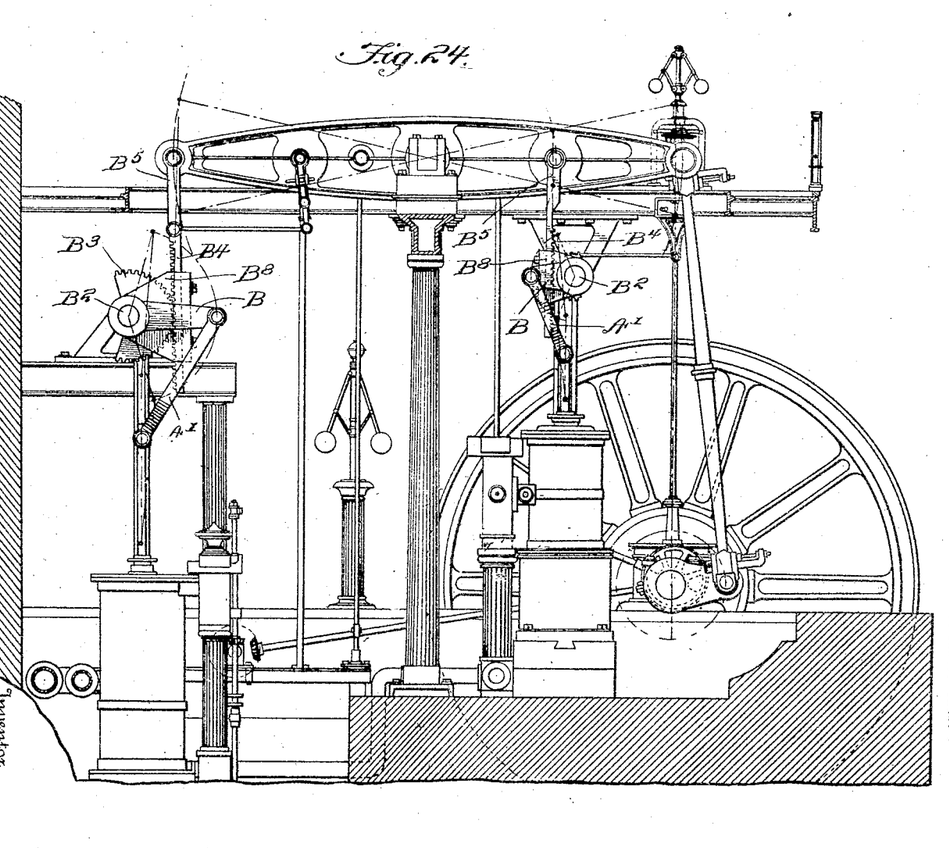
Fig. 24 shows an application of my invention to a walking beam steam engine.

In Figs. 21, 22, 23, I show a further modification of my transmitting members. In this, I follow the construction given in Figs. 16, 17 and 18, but in addition thereto I use grooves, D, forming part of the piston rod D¹, and make this rod rigid, in the position shown. The reciprocating action of the piston causes this rod to press on the rollers D² and gives motion to the lever cranks B—B.

Figure 25:
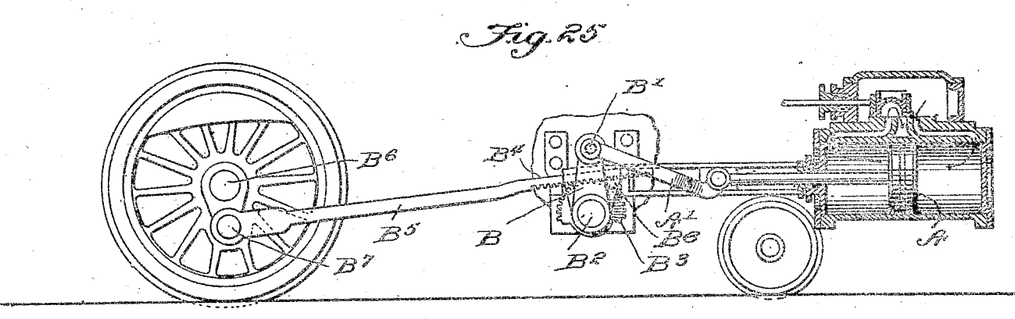
Fig. 25 represents my lever mechanism attached to the driving gear of a steam locomotive.
Figure 29:
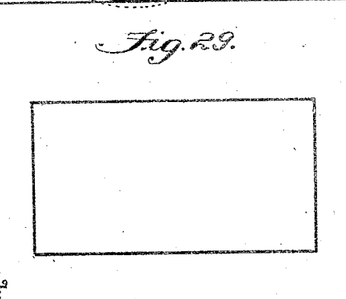
Figs. 29 and 30 are diagrammatic, showing the relative proportions of steam cylinders as affected by the long stroke of my transmission member.
Figure 30:
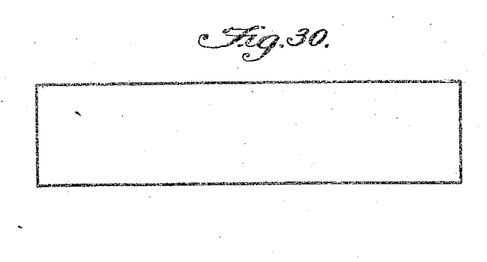

In Fig. 25 I show an application of my invention to the steam engine of a locomotive. Figs. 29 and 30 are diagrams indicating the variation of cylinder proportions required to adapt my invention to such an engine. As the travel of the piston exceeds that of the crank, I lengthen the cylinder in order to be able to effect a proper cut-off of the steam. By reducing the diameter of the steam cylinder and increasing its length I maintain the same area by volume.

It is evident that many forms of my invention may be made, and that the proportions of leverage to stroke can be changed to meet various conditions. I do not limit myself to the exact forms of the invention shown in this application.

What I claim to be novel, and ask to have protected by Letters Patent, is—

1. In a transmission member, the combination of an engine, a piston in said engine, a lever pivoted in relation to said piston, a pinion having a pitch diameter different from the length of said lever, a rack engaging said pinion, a pivoted movable guide for holding said rack in engagement with said lever, and a power shaft rotatable by the movement of said rack, substantially as described.

2. In a transmission member, the combination of an engine, a piston in said engine, a lever pivoted in relation to said engine, means for connecting said piston to said lever, a pinion having a pitch diameter different from the length of said lever, means for moving the lever and pinion synchronously, a rack engaging said pinion, a pivoted slidable guide for holding the rack in engagement with said pinion, and a power shaft rotatable by the movement of said rack, substantially as described.

3. In a transmission member, the combination of an engine, a piston in said engine, a lever pivoted in relation to said engine, a rod extending from said piston, means for connecting said rod to said piston, a pinion of a diameter different from the length of said lever, means for moving pinion and lever synchronously, a rack engaging said pinion a pivoted slidable guide for holding the rack in engagement with said pinion, a crank connecting rod forming part of said rack, and a power shaft rotatable by the action of said crank, substantially as described.

4. In a power transmission member, the combination of an engine, a piston in said engine, a rod grooved at its lower end and rigidly attached to said piston, a lever pivoted in relation to said piston and rod, a roller on said lever fitting in the groove of said rod, a pin supported in frame of said engine, a pinion pivoted on said pin, a rack engaging the teeth of said pinion, means for holding said rack in engagement with said pinion, a crank connecting rod forming part of said rack, and a crank that imparts the motion of said rack to a power shaft, substantially as described.

In testimony whereof I affix my signature.

ALVAH L. POWELL.